(12) United States Patent
He et al.

(10) Patent No.: US 11,209,568 B2
(45) Date of Patent: Dec. 28, 2021

(54) SHIELD ASSEMBLY FOR LOGGING TOOL SENSORS

(71) Applicant: Schlumberger Technology Corporation, Sugar Land, TX (US)

(72) Inventors: Qingyan He, Pearland, TX (US); Kent David Harms, Richmond, TX (US); Luis Pamintuan, Pearland, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/767,806

(22) PCT Filed: Nov. 27, 2018

(86) PCT No.: PCT/US2018/062506
§ 371 (c)(1),
(2) Date: May 28, 2020

(87) PCT Pub. No.: WO2019/108493
PCT Pub. Date: Jun. 6, 2019

(65) Prior Publication Data
US 2020/0348437 A1    Nov. 5, 2020

Related U.S. Application Data

(60) Provisional application No. 62/592,632, filed on Nov. 30, 2017.

(51) Int. Cl.
*E21B 47/017* (2012.01)
*G01V 3/30* (2006.01)
(Continued)

(52) U.S. Cl.
CPC .............. *G01V 3/30* (2013.01); *E21B 47/017* (2020.05); *E21B 47/12* (2013.01); *F16L 13/146* (2013.01); *F16L 33/225* (2013.01); *H01Q 1/04* (2013.01)

(58) Field of Classification Search
None
See application file for complete search history.

(56) References Cited

U.S. PATENT DOCUMENTS 7,436,183 B2 * 10/2008 Clark ...................... E21B 47/13
324/338
2002/0057210 A1    5/2002 Frey et al.
(Continued)

OTHER PUBLICATIONS

International Search Report and Written Opinion issued in International Patent application PCT/US2018/062506 dated Mar. 13, 2019, 14 pages.
(Continued)

*Primary Examiner* — Douglas X Rodriguez (57) ABSTRACT

A shield assembly for logging tool sensors includes a single piece cylindrical shield and first and second cylindrical end clamps deployed about opposing axial ends of the cylindrical shield. The cylindrical shield is deployed about a logging sensor disposed on a logging tool collar. At least one of the first and second end clamps includes one or more keys for engaging a corresponding slot in the shield and a corresponding pocket in an outer surface of the tool collar. Engagement of the key with the corresponding slot and the corresponding pocket is operative to prevent relative rotational and relative axial motion between the cylindrical shield, the first and second end clamps, and the tool collar.

20 Claims, 5 Drawing Sheets

(51) Int. Cl.
*E21B 47/12* (2012.01)
*F16L 13/14* (2006.01)
*F16L 33/22* (2006.01)
*H01Q 1/04* (2006.01)

(56) References Cited

U.S. PATENT DOCUMENTS

| | | |
|---|---|---|
| 2003/0068931 A1 | 4/2003 | Swearingen et al. |
| 2004/0061622 A1 | 4/2004 | Clark |
| 2011/0074427 A1 | 3/2011 | Wang et al. |
| 2012/0249149 A1 | 10/2012 | Bittar et al. |
| 2016/0327189 A1 | 11/2016 | Schroeder et al. |

OTHER PUBLICATIONS

Search and Examination Report under Rule 62 EPC issued in European patent application 18883045.9 dated Jul. 5, 2021, 6 pages.

\* cited by examiner

SHIELD ASSEMBLY FOR LOGGING TOOL SENSORS

CROSS REFERENCE TO RELATED APPLICATIONS

This application claims the benefit of U.S. Provisional Application Ser. No. 62/592,632 entitled Shield Mounting for Antenna Collar and Mandrel in Logging Tools, filed Nov. 30, 2017.

FIELD OF THE INVENTION

Disclosed embodiments relate generally to logging tools and more particularly to a shield assembly for protecting sensors deployed on logging tools such as electromagnetic logging tools.

BACKGROUND

The use of electromagnetic measurements in prior art downhole applications, such as logging while drilling (LWD) and wireline logging applications is well known. Such techniques may be utilized to determine a subterranean formation resistivity, which, along with formation porosity measurements, may be used to indicate the presence of hydrocarbons in the formation. Moreover, azimuthally sensitive directional resistivity measurements are employed to map subterranean reservoirs or to provide information upon which steering decisions may be made in pay-zone steering applications.

In such electromagnetic logging tools, shields may be used to protect the antennas and sensors that are integrated on the outer surface of the tool collar. The shields are intended to prevent the antennas from being damaged during downhole drilling, wellsite rigging up and rigging down, and shipping and handling. A reliable and effective shield and shield-mounting design can improve measurement and performance of LWD and wireline tools. There remains a need in the art for improved shields and shield mounting configurations.

SUMMARY

A shield assembly for logging tool sensors is disclosed. In disclosed embodiments the antenna shield includes a single piece cylindrical shield and first and second cylindrical end clamps deployed about opposing axial ends of the cylindrical shield. In certain embodiments, the cylindrical shield may optionally include a plurality of slits formed therethrough and may be sized and shaped for deployment about at least one electromagnetic antenna disposed about a logging tool collar. At least one of the first and second end clamps includes one or more keys sized and shaped for engaging a corresponding slot in the shield and a corresponding pocket in an outer surface of the tool collar. Engagement of the key with the corresponding slot and the corresponding pocket is operative to prevent relative rotational and relative axial motion between the cylindrical shield, the first and second end clamps, and the tool collar.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

A shield assembly for logging tool sensors is disclosed. In one example embodiment, the shield assembly includes a single piece cylindrical shield secured to a logging tool collar by first and second axially opposed end clamps. Engagement of at least one key with a corresponding pocket is operative to prevent relative rotational and relative axial motion between the cylindrical shield, the first and second end clamps, and the logging tool collar.

The disclosed embodiments may provide various technical advantages and improvements to prior art shield assemblies employed in electromagnetic logging tools. For example, disclosed shield assembly embodiments tend to exhibit significantly improved structural integrity, particularly for shield embodiments having a length to diameter ratio greater than about 1 (e.g., 1.5 or more or 2 or more). The disclosed shield assembly tends to improve resistance to bending, bidirectional torsion loads, impacting, wearing, and tearing during drilling and further tends to be more resistant to the ingress of drilling fluid since there are no seams that can open and close during tool bending or rotation. Such resistance also tends to provide a more stable electromagnetic window (as defined by the slits) and therefore tends to improve the quality and reliability of the transmitted or received electromagnetic signal during various drilling conditions. Moreover, the use of end clamps having integral keys that engage corresponding embedded pockets in the collar enables the clamps to be load bearing and withstand large bidirectional torsional loads from lateral impacts and frictional interaction with the borehole wall during drilling.

Figure 1:
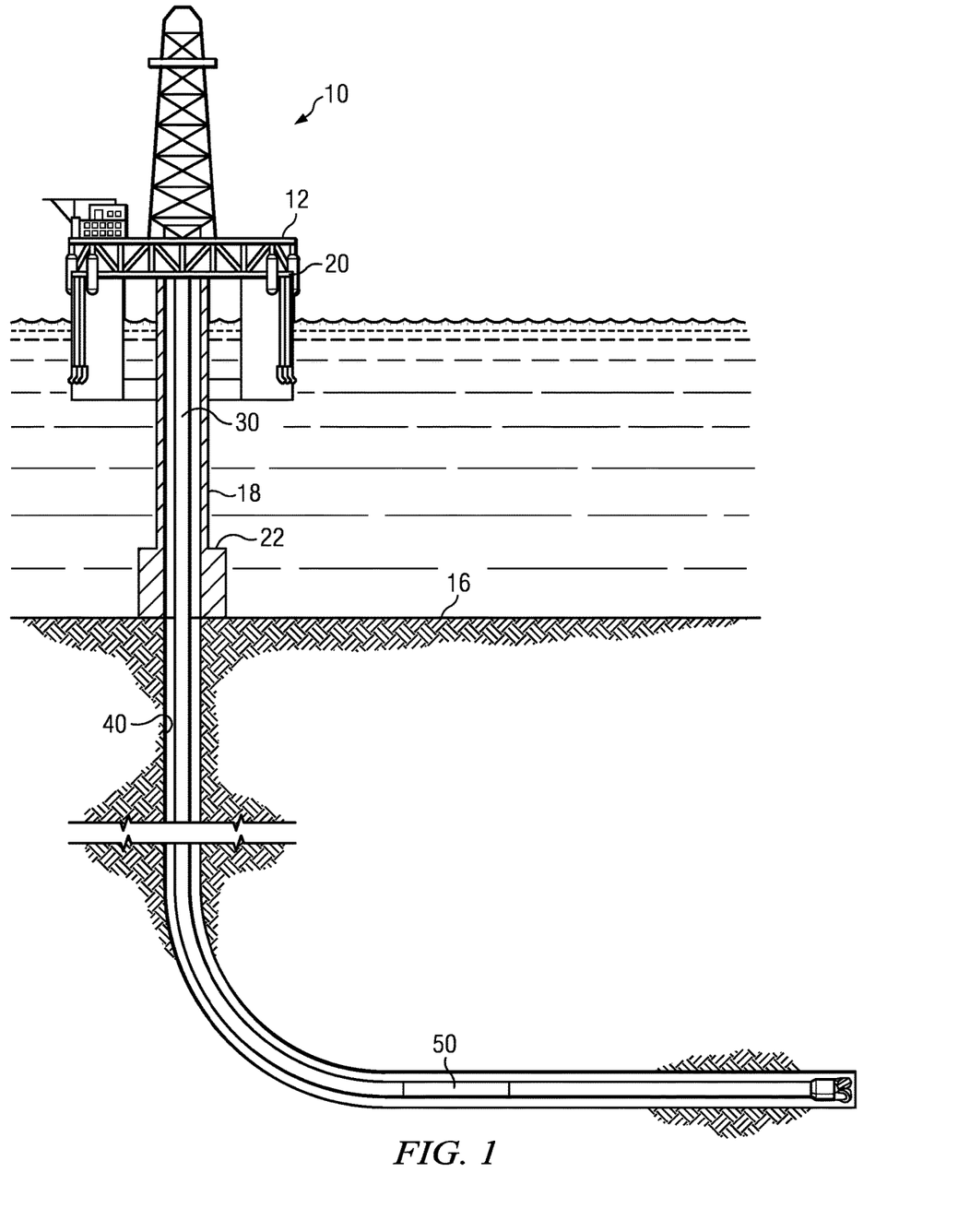
FIG. 1 depicts an example drilling rig on which disclosed embodiments may be utilized.

FIG. 1 depicts a drilling rig 10 suitable for using various logging tools employing the shield assembly embodiments disclosed herein. A semisubmersible drilling platform 12 is positioned over an oil or gas formation disposed below the sea floor 16. A subsea conduit 18 extends from deck 20 of platform 12 to a wellhead installation 22. The platform may include a derrick and a hoisting apparatus for raising and lowering a drill string 30, which, as shown, extends into wellbore 40 and includes a drill bit 32 and an electromagnetic logging tool 50 upon which the disclosed shield assembly may be deployed (e.g., about a directional resistivity antenna). Drill string 30 may optionally further include any number of other downhole tools, for example, including a rotary steerable drilling tool, a downhole drilling motor, a downhole telemetry system, a wellbore reaming tool, and one or more additional measurement while drilling (MWD) or LWD tools including various sensors for sensing downhole characteristics of the wellbore and the surrounding formations. The disclosed embodiments are not limited in these regards.

It will be understood by those of ordinary skill in the art that the deployment illustrated on FIG. 1 is merely an example. It will be further understood that disclosed embodiments are not limited to use with a semisubmersible platform 12 as illustrated on FIG. 1. The disclosed embodiments are equally well suited for use with any kind of subterranean drilling operation, either offshore or onshore. Moreover, disclosed embodiments are not limited to logging while drilling embodiments as illustrated on FIG. 1. The disclosed embodiments are equally well suited for use with any logging tool, including wireline logging tools and logging while drilling tools.

Figure 2A:
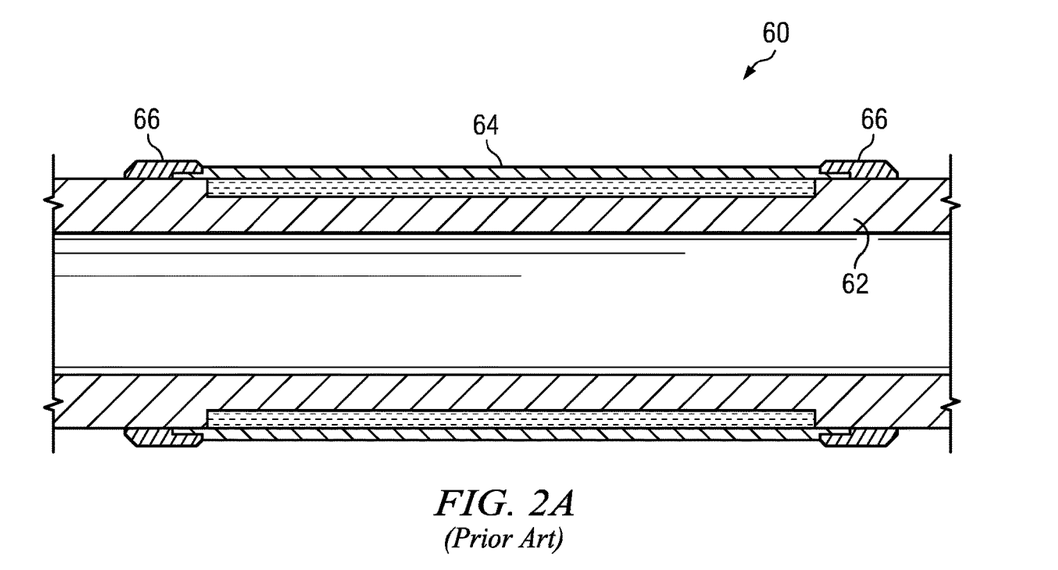
FIGS. 2A and 2B depict prior art shield assemblies.

FIG. 2A depicts one prior art shield assembly 60 that includes a slide-on shield 64. Rings 66 are threadably connected to the logging tool collar 62 and thereby secure the shield 64 to the collar 62. During tool makeup, the slide-on shield 64 is deployed about the antenna, rotated to an appropriate orientation, and secured in place at opposing axial ends by the threaded rings 66. Tightening of the threaded rings 66 axially compresses the shield 64 and is intended to thereby secure the shield in place. Shield assembly 60 is commercially available in various PeriScope® and GeoSphere® logging tools available from Schlumberger Technology Corporation (Sugar Land, Tex.). The threaded rings 66, having an outer diameter greater than that of the shield 64 and the collar 62, can be prone to borehole contact and loosening during a drilling operation. Loosening of the threaded rings 66 allows the shield to move/vibrate about the collar 62 and may ruin the electromagnetic measurements (especially when the shield 62 is deployed about a directional antenna). In severe cases, loosening of the threaded rings 66 can be accompanied by the loss of tool parts downhole which may compromise the overall drilling objective.

Figure 2B:
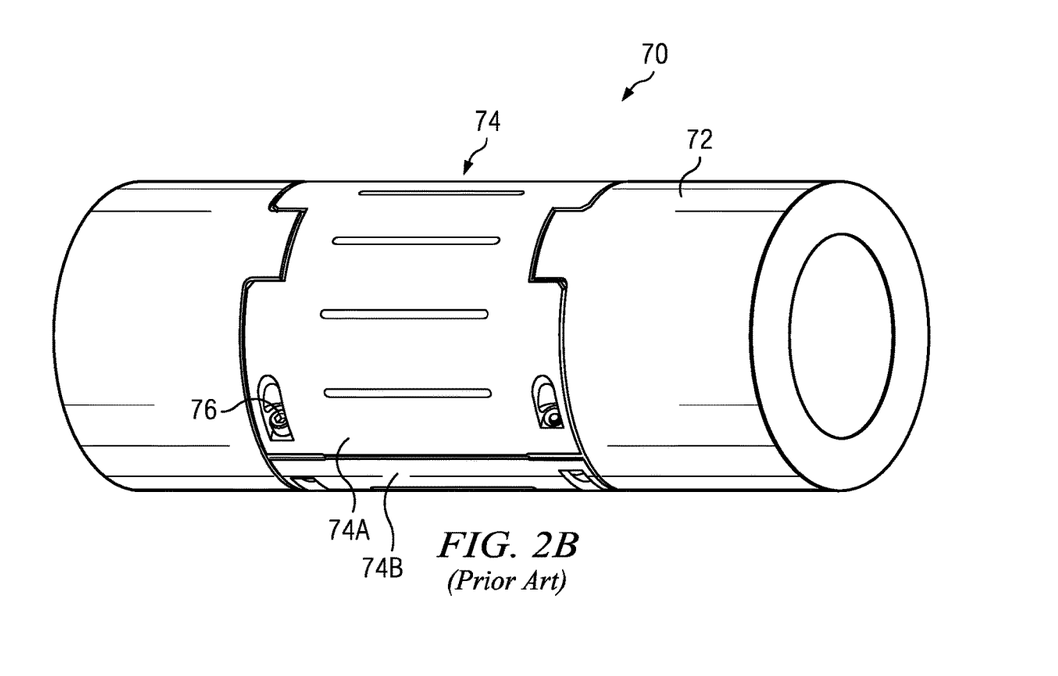

FIG. 2B depicts another prior art shield assembly 70 that includes a split shield 74 including first and second semicylindrical shield components 74A and 74B mounted on the logging tool collar 72. During tool make-up, the shield components 74A and 74B are deployed about the antenna, rotated to an appropriate orientation, and secured in place on the collar 72 and to one another with screws at each corner quadrant (as depicted). Shield assembly 70 is commercially available in various arcVISION®, EcoScope®, and MicroScope® logging tools available from Schlumberger Technology Corporation (Sugar Land, Tex.). One advantage of shield assembly 70 is the low profile of the shield 74 in which the outer diameter of the shield 74 can be essentially flush with the outer diameter of the collar. However, the use of the split shield configuration tends to result in a loss of structural integrity in the vicinity of the seams 76 located between the two shield components 74A and 74B. This loss of structural integrity can lead to warping or bending of the shield or opening of the seam which may create another slit and may therefore contaminate the electromagnetic measurements. The loss of structural integrity may further result in damage to the antenna itself. This can be particularly acute in shield assemblies configured for use in directional antennas or triaxial antennas in which the axial length of the shield is greater than the diameter of the tool collar.

Figure 3:
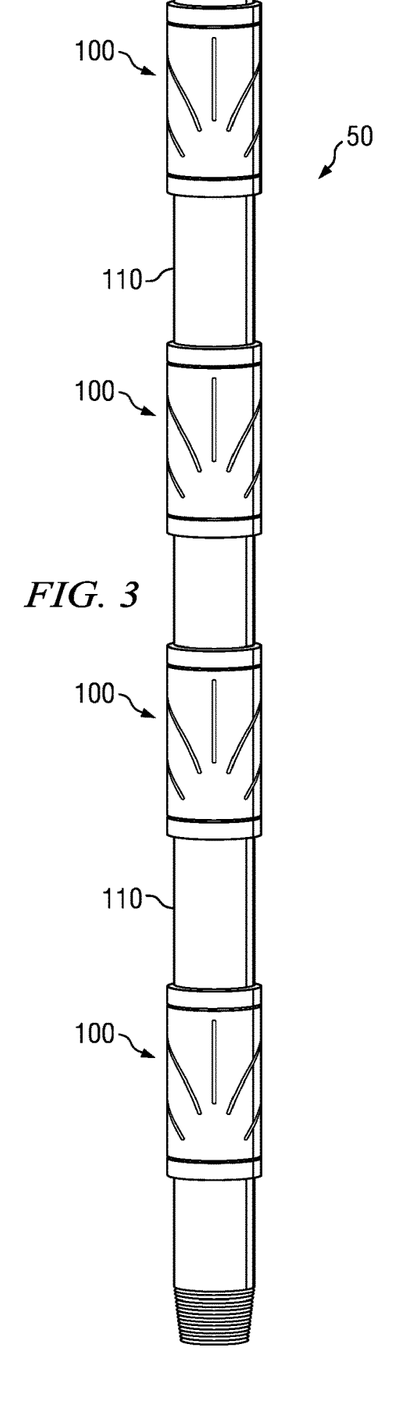
FIG. 3 depicts one example of an electromagnetic logging tool including the disclosed shield assembly.

Turning now to FIG. 3, one example embodiment of logging tool 50 is depicted including at least one of the disclosed shield assemblies 100 deployed about a logging tool collar 110. It will be understood that the logging tool 50 may include substantially any suitable number of the shield assemblies 100 deployed about corresponding sensors (which may be the same or different). The sensors may be configured as electromagnetic transmitters and/or electromagnetic receivers. Moreover, the shield assembly(ies) 100 may be deployed about a single antenna or a plurality of collocated antennas (e.g., biaxial or triaxial antennas). The disclosed embodiments are not limited in any of these regards.

The disclosed shield assembly 100 may be particularly useful when deployed about a directional antenna or a tilted antenna. For example, the shield assembly 100 may be deployed about a triaxial antenna arrangement such as an arrangement including three tilted antennas or an arrangement including an axial antenna and two transverse antennas. It will be understood that an axial antenna is one whose moment is substantially parallel with the longitudinal axis of the tool while a transverse antenna is one whose moment is substantially perpendicular to the longitudinal axis of the tool. A tilted antenna is one whose moment is neither parallel nor perpendicular with the axis of the tool. Such antennas are well known.

It will be understood that directional antennas, tilted antennas, and bi- and triaxial antenna arrangements may have having a length to width ratio greater than one (i.e., such that the axial dimension of the antenna along the collar is greater than the diameter of the collar). In such embodiments, the length to diameter ratio of the shield assembly may exceed 1 (or about 1.5 or even about 2 or more). Such high ratio antenna configurations can result in severe loads being imparted to the shield assembly during service, for example, via bending or twisting of the shield. Suitable shield assemblies advantageously account for and are configured to withstand this loading.

While the disclosed embodiments are described in detail with respect to shielding transmitting and receiving antennas employed electromagnetic logging tools, it will be understood that the disclosed embodiments are not so limited. The disclosed shield assembly may be used to protect substantially any suitable logging sensor, for example, including piezoelectric transducers used in sonic or ultrasonic logging tools and radio frequency antennas used in nuclear magnetic resonance logging tools.

FIGS. 4A-4C and 5A-5B depict side (4A) and cross sectional views (4B-4C and 5A-5B) of one example embodiment of antenna assembly 100. As depicted, the antenna assembly 100 includes a single-piece, cylindrical shield 120 deployed about the tool collar 110 and covering the electromagnetic antenna 55. The cylindrical shield may be made from a high strength, erosion and corrosion resistant, non-magnetic material. While non-magnetic metals may be used, the disclosed embodiments are not limited to metal shields. When a metallic (electrically conductive) shield is employed, a plurality of slits 122 may be formed therethrough (i.e., such that they extend through the thickness of the cylinder wall). For example, the slits 122 may be machined (cut) into the cylindrical shield 120. Such slits 122 allow a portion of the electromagnetic wave (e.g., emanating from a transmitting antenna or passing from the formation to receiving antenna) to pass through the cylindrical shield 120. The slits 122 may be filled with a non-conductive, electromagnetically transparent material such as epoxy, fiberglass, or plastic so as to allow passage of the electromagnetic wave while inhibiting fluid communication therethrough.

The disclosed embodiments may include substantially any suitable slit configuration, for example, including axial slits, circumferential slits, sloped or tilted slits, curved slits, or combinations thereof. It will be understood that the preferred slit configuration largely depends on the antenna configuration protected by the shield and that the slits may be selected to promote transparency of certain preferred electromagnetic waves. The disclosed embodiments are not limited to any particular slit configuration.

Figure 6A:
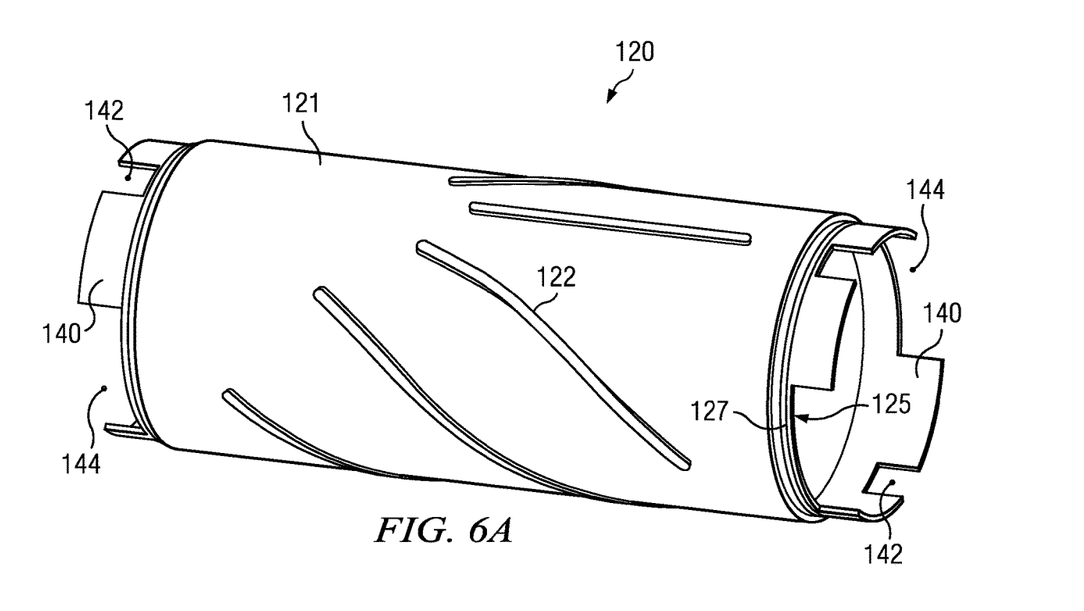
FIGS. 6A and 6B depict perspective views of a single piece, cylindrical shield portion (5A) and an end clamp portion (5B) of the shield assembly shown on FIGS. 4A-4C.
Figure 6B:
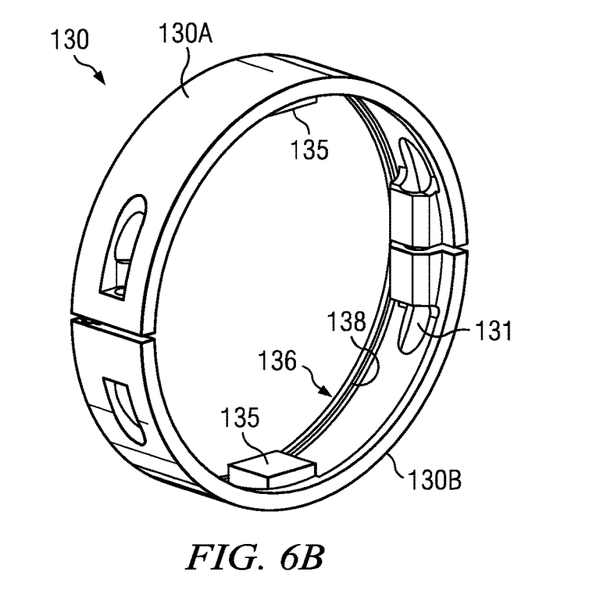

Shield assembly 150 further includes first and second cylindrical end clamps 130 deployed about opposing axial ends of the cylindrical shield 120. In the depicted embodiment, the end clamps 130 each include first and second semi-cylindrical split clamps 130A, 130B (FIG. 6B). While the disclosed embodiments are not limited in this regard, these split clamps may be screwed 132 to one another during tool assembly thereby securing the cylindrical shield 120 in place about the tool collar 110 and the electromagnetic antenna 55. In alternative embodiments, the single piece shield and/or the end clamps may be screwed directly to the collar. In another alternative embodiment the split clamps may be connected to another via other (non-screw) connectors.

The end clamps 130 further include at least one key 135, for example, integral with an inner diameter thereof. The key 135 is sized and shaped to engage a corresponding slot 142 (FIG. 6A) in the cylindrical shield and a corresponding pocket 112 located on an outer surface of the collar 110. In the depicted embodiment, each of the split clamps 130A, 130B in each of the end clamps 130 includes a corresponding key 135 (for a total of 4 keys), such that the made up end clamp 130 includes first and second diametrically opposed keys 135 that are configured to engage corresponding diametrically opposed pockets 112 in the tool collar 110.

While the embodiments disclosed on FIGS. 4A-4C, 5A-5B, and 6A-6B, employ four keys, it will be understood that some embodiments may employ only a single key. For example, the disclosed embodiments may make use of a one or two keys located on one of the end clamps 130 (e.g. on either the uphole or the downhole end clamp). In such an embodiment, the axially opposing end clamp is allowed to "float" in the sense that it is not rotationally or axially fixed to the collar 110. Such floating may optionally be restricted to rotation only or translation only.

In the depicted embodiments, the keys 135 and pockets 112 are integral with and embedded in the inner diameter of the end clamp 130 and the outer diameter of the tool collar 110, respectively. In addition to providing proper alignment between the shield assembly components, such a configuration enables these components to be load bearing. For example, the above described configuration may advantageously withstand bidirectional torsional loads from lateral impacts and frictional interaction with the borehole wall during drilling.

While the use of an integral key (or integral keys) may be advantageous as described above, the disclosed embodiments are expressly not limited in this regard. For example, the key (or keys) may be a distinct component that is configured to engage a corresponding pocket, slot, or window in each of the collar, cylindrical shield, and end clamps. Such a distinct key may be deployed before or after securing the end clamp to the collar.

With reference now to FIGS. 5A, 5B, 6A, and 6B, the cylindrical shield 120 may include a cylindrical body portion 121 (through which the slits 122 penetrate) and a plurality of tabs 140 extending axially from the body portion 121. These tabs 140 define axial slots 142, 144. Upon deployment of the end clamps 130, the tabs 140 are radially interposed between the tool collar 110 and corresponding ones of the end clamps 130 (e.g., corresponding ones of the split clamps 130A, 130B in the depicted embodiment). Slots 142 engage keys 135 as described above. Slots 144 accommodate screws 132 used to secure the split clamps 130A, 130B to one another. The disclosed embodiments are not limited to the use tabs that result in open ended slots 142 as depicted. In some embodiments, the slots may be closed, for example, cut out of the cylindrical shield.

The cylindrical body portion 121 may further include at least one stepped down outer diameter surface 125 located on either one or both axial ends thereof. One or both of the end clamps 130 may further include corresponding stepped out inner surfaces 136 configured to engage the stepped down outer diameter surfaces 125 of the cylindrical shield 120 during makeup of the shield assembly. While not limited in this regard, in the depicted embodiment, the stepped down outer diameter surfaces 125 include a circumferential protrusion 127 that is sized and shaped to engage a corresponding circumferential channel 138 in the stepped out inner surfaces 136 of the end clamps 130. The protrusion 127 and corresponding channel 138 are intended to further secure the end clamps 130 to the cylindrical shield 120.

Figure 4A:
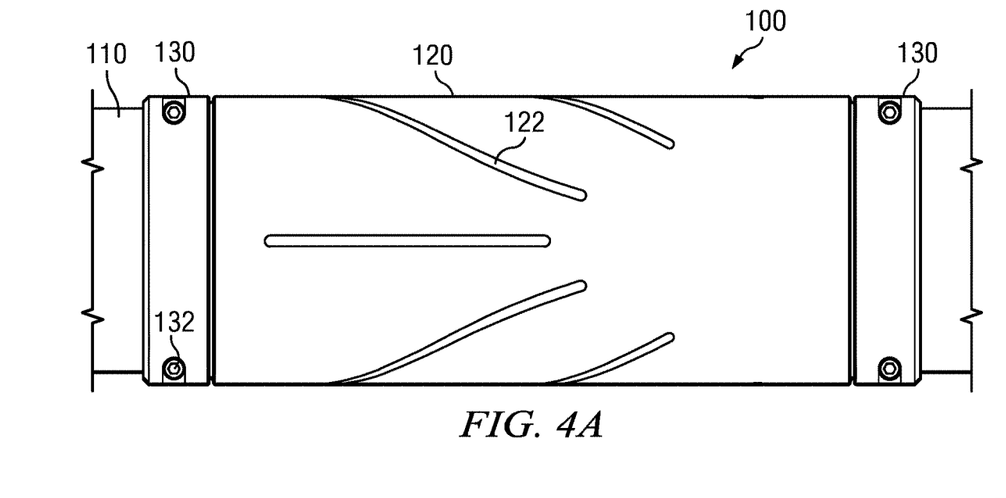
FIGS. 4A, 4B, and 4C, depict a side view (4A) and longitudinal (4B) and axial (4C) cross sectional views of one example embodiment of the antenna assembly shown on FIG. 3.
Figure 4B:
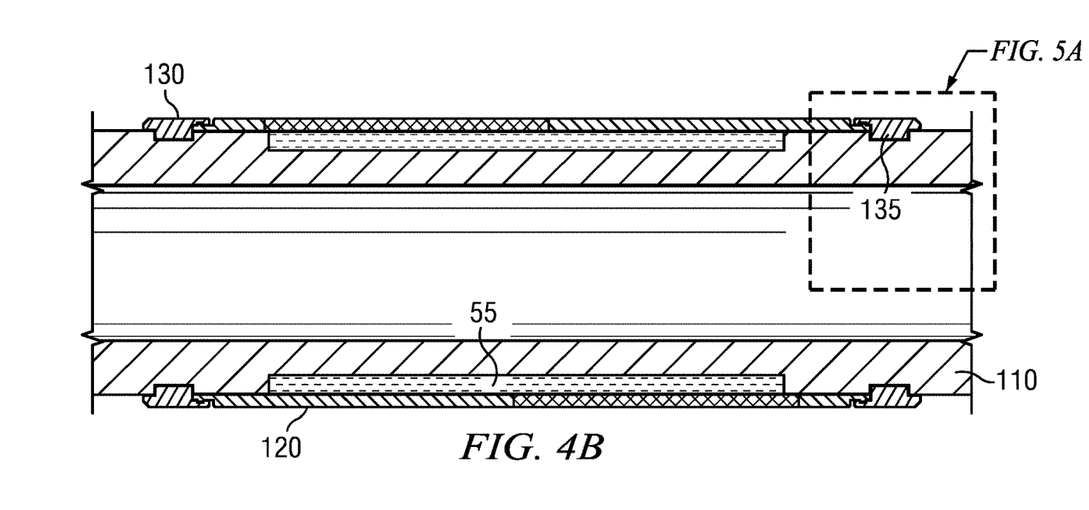
Figure 4C:
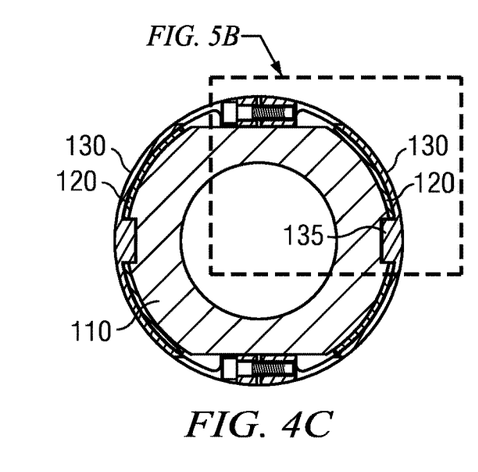
Figure 5A:
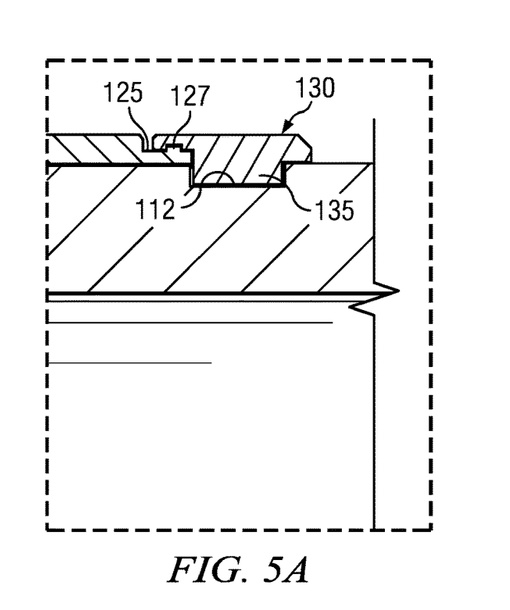
FIGS. 5A and 5B depict detailed cross sections indicated on FIGS. 4B and 4C.
Figure 5B:
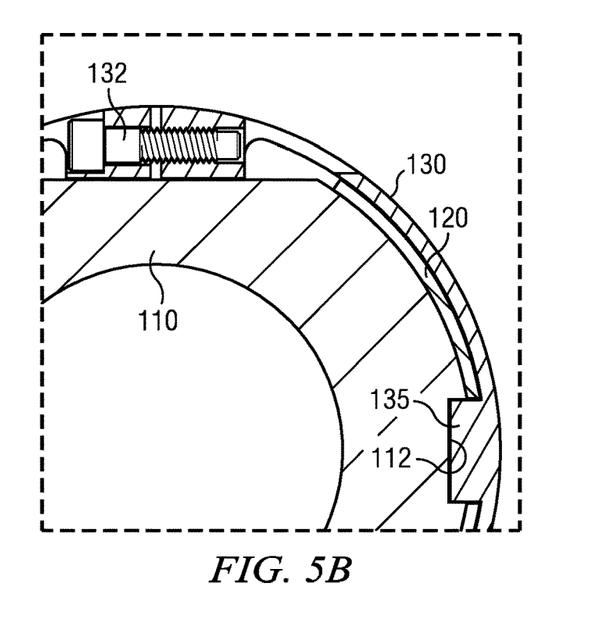

In the depicted embodiments, the end clamps 130 and the cylindrical shield 120 have substantially equal outer diameters (e.g., as depicted on FIG. 4A). Such a configuration advantageously reduces the chance of a direct strike of the clamps 130 on the borehole wall and further tends to reduce erosion and wear of the clamps 130 during service. The low-profile clamp configuration also enables the clamps 130 to be more easily protected by sacrificial components on the collar (such as wear rings).

During makeup of the disclosed shield assembly, the cylindrical shield 120 slides over the outer surface of the collar 110 until it covers the antenna 55. The cylindrical shield 120 is rotated into the proper orientation, for example, such that the slits 122 are properly aligned with the underlying antenna coils. The split clamps 135A, 135B are then installed about the axial ends of the cylindrical shield 120 such that the keys 135 engage corresponding pockets 112 and slots 142. Such engagement controls the alignment/orientation of the cylindrical shield and further prevents relative rotational and relative axial motion between the cylindrical shield 120, the first and second end clamps 130, and the tool collar 110. As stated above, the split clamps 135A, 135B may be secured to one another via screws 132. Torqueing the screws 132 generates clamp pressure which is applied to the external surfaces of the shield 120 and secures the assembly to the mandrel 110. With a proper amount of preload in the screws 132, significant clamping force and elastic deformation among the components can be generated to secure the shield 120 to the collar so as to withstand downhole pressure, bending, shock, and vibration.

Although an antenna shield assembly for directional resistivity logging tools and certain advantages thereof have been described in detail, it should be understood that various changes, substitutions and alterations may be made herein without departing from the spirit and scope of the disclosure. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The invention claimed is:

1. An antenna shield assembly for a logging tool sensor, the shield assembly comprising:
   a single piece cylindrical shield deployed about at least one logging sensor disposed on a logging tool collar;
   first and second cylindrical end clamps deployed about opposing axial ends of the cylindrical shield, at least one of the first and second end clamps including a key engaging a corresponding slot in the shield and a corresponding pocket in an outer surface of the tool collar, the key extending radially inward from the end clamp through the corresponding slot in the shield and into the corresponding pocket in the outer surface of the tool collar;
   said engagement of the at least one key with the corresponding slot and the corresponding pocket operative to prevent relative rotational and relative axial motion between the cylindrical shield, the first and second end clamps, and the tool collar.

2. The assembly of claim 1, wherein the cylindrical shield includes a plurality of slits formed therethrough.

3. The assembly of claim 2, wherein the at least one electromagnetic antenna comprises at least one transverse antenna, at least one tilted antenna, a biaxial antenna arrangement, or a triaxial antenna arrangement.

4. The assembly of claim 2, wherein the cylindrical shield has a length to diameter ratio greater than about 1.5.

5. The assembly of claim 1, wherein each of the cylindrical end clamps comprises first and second semi-cylindrical, split clamps that are connected to one another.

6. The assembly of claim 1, wherein an outer diameter of the cylindrical shield and outer diameters of each of the end clamps are substantially equal.

7. The assembly of claim 1, wherein the key is a distinct component that is configured to engage the corresponding slot in the shield, the corresponding pocket in the tool collar, and a corresponding slot in at least one of the end clamps.

8. The assembly of claim 1, wherein the key is integral with an inner wall of the at least one of the first and second end clamps.

9. The assembly of claim 1, wherein:
   the first end clamp comprises at least a first key extending radially inward through a first corresponding slot in the shield and into a first corresponding pocket in the outer surface of the tool collar; and
   the second end clamp comprises at least a second key extending radially inward through a second corresponding slot in the shield and into a second corresponding pocket in the outer surface of the tool collar.

10. The assembly of claim 9, wherein:
    each of the first and second end clamps comprises two diametrically opposed keys engaging corresponding slots in the shield and corresponding pockets in the outer surface of the tool collar; and
    each of the keys is integral with an inner surface of the corresponding end clamp.

11. The assembly of claim 1, wherein:
    the cylindrical shield comprises a cylindrical body portion and a plurality of tabs extending axially from the body portion;
    the plurality of tabs are radially interposed between the tool collar and corresponding ones of the end clamps; and
    the slot in the shield is located circumferentially between first and second ones of the plurality of tabs.

12. The assembly of claim 1 wherein:
    the cylindrical shield comprises a stepped down outer diameter surface on at least one axial end thereof; and
    at least one of the first and second end clamps comprises an inner diameter surface that engages the stepped down outer diameter surface on the cylindrical shield.

13. The assembly of claim 1, wherein:
    the cylindrical shield comprises a stepped down outer diameter surface on each axial end thereof;
    each of the first and second end clamps comprises an inner diameter surface that engages a corresponding one of the stepped down outer diameter surfaces on the cylindrical shield; and
    the stepped down outer diameter surfaces comprise a circumferential protrusion that engages a corresponding circumferential channel in the inner diameter surfaces.

14. An electromagnetic logging tool comprising:
    a logging tool collar;
    an electromagnetic antenna deployed about the logging tool collar;
    a single piece cylindrical shield deployed about the electromagnetic antenna, the shield having a plurality of slits formed therethrough;
    first and second cylindrical end clamps deployed about opposing axial ends of the cylindrical shield, at least one of the first and second end clamps including a key engaging a corresponding slot in the shield and a corresponding pocket in an outer surface of the tool collar, the key extending radially inward from the end clamp through the corresponding slot in the shield and into the corresponding pocket in the outer surface of the tool collar;

said engagement of the at least one key with the corresponding slot and the corresponding pocket operative to prevent relative rotational and relative axial motion between the cylindrical shield, the first and second end clamps, and the tool collar.

15. The logging tool of claim 14, wherein:

the electromagnetic antenna comprises at least one transverse antenna, at least one tilted antenna, a biaxial antenna arrangement, or a triaxial antenna arrangement; and the cylindrical shield has a length to diameter ratio greater than about 1.5.

16. The logging tool of claim 14, wherein:

each of the cylindrical end clamps comprises first and second semi-cylindrical split clamps that are connected to one another; and an outer diameter of the cylindrical shield and outer diameters of each of the end clamps are substantially equal.

17. The logging tool of claim 16, wherein the first and second split clamps are screwed to one another.

18. The logging tool of claim 14, wherein:

each of the first and second end clamps comprises two diametrically opposed keys engaging corresponding diametrical opposed slots in the shield and corresponding diametrically opposed pockets in the outer surface of the tool collar; and each of the keys is integral with an inner surface of the corresponding end clamp.

19. The logging tool of claim 14, wherein:

the cylindrical shield comprises a cylindrical body portion and a plurality of tabs extending axially from the body portion;

the plurality of tabs are radially interposed between the tool collar and corresponding ones of the end clamps; and the slots in the shield are located circumferentially between adjacent ones of the plurality of tabs.

20. The logging tool of claim 14, wherein:

the body portion of the cylindrical shield comprises a stepped down outer diameter surface on each axial end thereof;

each of the first and second end clamps comprises an inner diameter surface that engages a corresponding one of the stepped down outer diameter surfaces on the body portion of the cylindrical shield; and the stepped down outer diameter surface comprises a circumferential protrusion that engages a corresponding circumferential channel in the inner diameter surface.

* * * * *